United States Patent
Smith

(10) Patent No.: US 7,997,360 B2
(45) Date of Patent: Aug. 16, 2011

(54) VEHICLE STEERING ARRANGEMENT AND METHOD

(75) Inventor: Andrew John Smith, Ashbourne (GB)

(73) Assignee: Caterpillar SARL, Geneva (CH)

( * ) Notice: Subject to any disclaimer, the term of this patent is extended or adjusted under 35 U.S.C. 154(b) by 368 days.

(21) Appl. No.: 12/087,153

(22) PCT Filed: Dec. 21, 2006

(86) PCT No.: PCT/EP2006/012395
§ 371 (c)(1),
(2), (4) Date: Nov. 20, 2008

(87) PCT Pub. No.: WO2007/073925
PCT Pub. Date: Jul. 5, 2007

(65) Prior Publication Data
US 2009/0301797 A1 Dec. 10, 2009

(30) Foreign Application Priority Data
Dec. 28, 2005 (EP) .................................. 05113048

(51) Int. Cl.
*B62D 11/04* (2006.01)
(52) U.S. Cl. ........ 180/6.48; 180/6.6; 180/6.62; 180/307
(58) Field of Classification Search .................. 180/6.48, 180/6.3, 6.6, 6.58, 305, 307
See application file for complete search history.

(56) References Cited

U.S. PATENT DOCUMENTS

| 3,175,570 | A | * | 3/1965 | Copie et al. | 137/101 |
|---|---|---|---|---|---|
| 3,672,161 | A | * | 6/1972 | Krusche et al. | 60/420 |
| 3,828,875 | A | * | 8/1974 | Tarter | 180/14.3 |
| 4,399,886 | A | * | 8/1983 | Pollman | 180/197 |
| 4,457,387 | A | | 7/1984 | Taylor et al. | |
| 4,554,991 | A | * | 11/1985 | Eden | 180/243 |
| 5,259,470 | A | * | 11/1993 | Akahane et al. | 180/6.34 |
| 5,282,363 | A | * | 2/1994 | Ogawa et al. | 60/420 |

(Continued)

FOREIGN PATENT DOCUMENTS

JP 05116553 A * 5/1993

(Continued)

OTHER PUBLICATIONS

PCT International Search Report and Written Opinion mailed Mar. 26, 2007 in Application PCT/EP2006/012395 (9 pages).

(Continued)

*Primary Examiner* — Tony H. Winner
*Assistant Examiner* — Wesley Potter
(74) *Attorney, Agent, or Firm* — Finnegan, Henderson, Farabow, Garrett & Dunner LLP

(57) ABSTRACT

Vehicles with open loop hydraulic steering systems may suffer from jerky steering due to the necessity to have safety valves in the open loop system to prevent uncontrolled vehicle movement. Traditional open loop steering arrangements allow steering by controlling fluid quantities flowing from the pump to the drive motors. The disclosed vehicle has an open loop hydraulic drive system including first and second variable displacement motors for driving ground engaging mechanisms at first and second sides of the vehicle, respectively. The system includes a control mechanism configured for steering the vehicle by changing the displacement of one of the first and second motors. This allows the operator to change the drive motor speed range during travel.

20 Claims, 2 Drawing Sheets

U.S. PATENT DOCUMENTS

| | | | |
|---|---|---|---|
| 5,282,516 A | 2/1994 | Price et al. | |
| 5,529,134 A | 6/1996 | Yomogita et al. | |
| 6,062,332 A * | 5/2000 | Stephenson et al. | 180/305 |
| 6,757,993 B2 * | 7/2004 | Kondou | 37/348 |
| 6,786,289 B2 * | 9/2004 | Bateman et al. | 180/6.48 |
| 6,857,494 B2 * | 2/2005 | Kobayashi et al. | 180/243 |
| 7,178,334 B2 * | 2/2007 | Beck | 60/424 |
| 2002/0100630 A1 * | 8/2002 | Evans et al. | 180/307 |

FOREIGN PATENT DOCUMENTS

| | | |
|---|---|---|
| WO | 02/12641 A1 | 2/2002 |

OTHER PUBLICATIONS

European Search Report mailed Apr. 28, 2006, in Application No. 05113048.2-2425 (8 pages).

* cited by examiner

VEHICLE STEERING ARRANGEMENT AND METHOD

PRIORITY STATEMENT

This application is the National Stage, filed under 35 U.S.C. §371, of International Application PCT/EP2006/012395 having an International Filing Date of Dec. 21, 2006, and published Jul. 5, 2007, as International Publication No. WO/2007/073925. Applicant claims benefit of priority under 35 U.S.C. §119(a) and §365(b) of European Patent Application No. 05113048.2 filed Dec. 28, 2005.

TECHNICAL FIELD

This disclosure relates to a steering arrangement and method for a work machine. In particular, but not exclusively, it relates to a steering arrangement and method for skid steer or tracked vehicles with open loop hydraulic drive arrangements.

BACKGROUND

Skid steer or tracked vehicles such as mini hydraulic excavators (MHE) commonly have an open loop hydraulic transmission for propelling and steering the vehicle. One simplified example of an open loop system may have a fluid reservoir for a fluid such as hydraulic oil, of which a pump can draw a volume of fluid. The pump pressurizes the fluid and sends this to at least one of two motors (one for each track) which is coupled to a track such that the rotating motor will turn the track thereby moving the vehicle. Once the fluid has passed through the motor the fluid is returned to the reservoir. For comparison, in a closed loop system the return flow from the motor would return to the pump instead of the reservoir. Closed loop systems tend to provide superior vehicle control, but generally require more sophisticated pumps, motors and control software resulting in higher levels of complexity and expense.

In a closed loop arrangement the return flow can flow no faster than what the pump can take in. For example, on an inclined terrain the vehicle will tend to roll downwards whereby the track is inclined to drive the motor instead of the motor driving the track. However, the motor cannot displace more fluid than the pump can take in, therefore the motor is prevented from speeding up and the operator remains in control of vehicle speed. In an open loop system without any additional controls in place, the motor would be able to freely dispose of the fluid into the tank leading to potentially uncontrolled vehicle behavior such as a run away condition of the machine. To prevent this situation, over center lock valves may be fitted in the motor return line. As the motor is bi-directional, an over center lock valve is fitted in both supply/return lines to each motor.

Steering of vehicles with open loop steering arrangements is achieved by providing the two motors with different fluid quantities or opposite flows, thereby causing the tracks to have different speeds and/or directions. One problem associated with open loop systems is the repeated switching of the over center lock valves in response to varying flows and pressures created during the steering process. Operator control may not always be smooth and the system is affected by changing torque and power requirements during a steering maneuver. This causes the over center valve to open and close repeatedly making the steering maneuver jerky and uncontrolled. This may lead to problems with modern machinery where high travel speeds are demanded to reduce travel times when moving between sites. To avoid those problems, an operator may have to slow down the vehicle or come to a complete standstill before engaging a turn. To increase smoothness during a turn the machine may be equipped with cross line relief valves between the motor inlet and outlet ports as this enables a continued rotation of the braked motor as fluid is moved across the relief valve during turning hence softening the turn to a degree. As the range relief valve settings are limited due to system relief valve settings, cross line relief is only a partial alleviation of some of the problems.

The following disclosure is directed to one or more improvements in the existing technology.

SUMMARY

In one aspect, a vehicle includes an open loop hydraulic drive system. The open loop hydraulic drive system includes a first and a second variable displacement hydraulic motor for driving ground engaging mechanisms at opposite sides of the vehicle and a control mechanism for steering the vehicle by changing the displacement of one of the first and second motors.

In another aspect, a method of turning a vehicle includes an open loop hydraulic drive system, wherein the open loop hydraulic drive system includes a first and a second variable displacement hydraulic motor for driving ground engaging mechanisms at opposite sides of the vehicle. The method includes selecting a desired vehicle direction and changing the displacement of at least one of the first and second motors in response to the selection of a desired vehicle direction to thereby turn the vehicle.

Other features and aspects of this disclosure will be apparent from the following description and the accompanying drawings.

DETAILED DESCRIPTION

Figure 1:
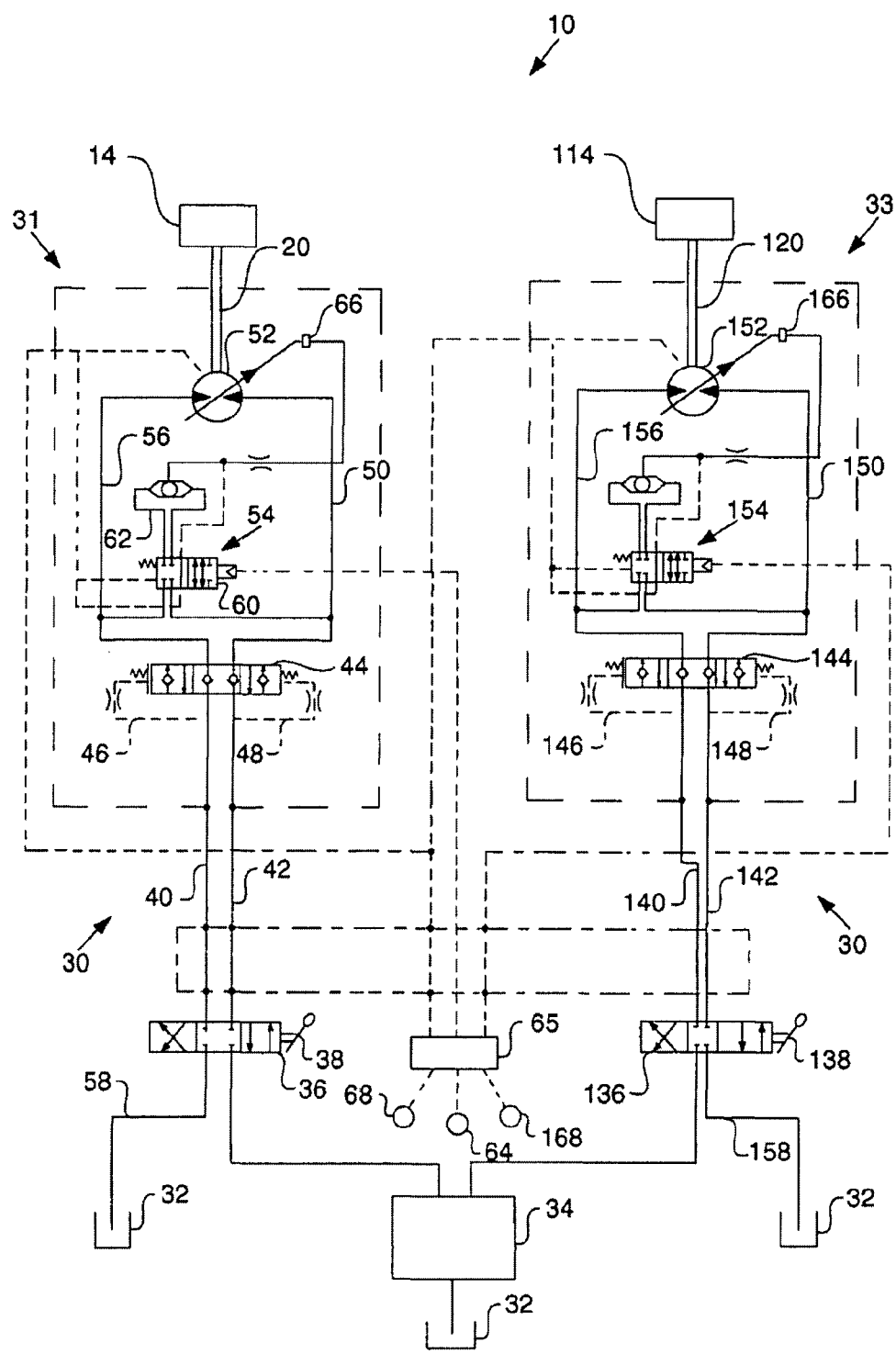
FIG. 1. is a schematic of a vehicle with an open loop steering system in accordance with an embodiment of the current disclosure.

FIG. 1 shows a schematic for a vehicle 10 with a steering arrangement such that steering is achieved by inducing different speeds between opposite ground engaging driving mechanisms such as typically found on skid steer type machines or tracked vehicles. Examples of such machine are tracked hydraulic excavators or skid steer loaders, either tracked or equipped with non-steerable wheels. For exemplary purposes only, an embodiment of the current disclosure, such as vehicle 10 as shown in FIG. 1, may be a mini hydraulic excavator (MHE) with tracks, but by no means is the application of this disclosure limited to a MHE with tracks.

Vehicle 10 has a left hand side track 14 and a right hand side track 114 for driving opposite sides of the vehicle 10. Both tracks are connected with a hydraulic system 30 via shaft and gearbox arrangements 20 and 120 for driving and steering the vehicle 10.

The hydraulic system 30 may vary in design but may be characterized as an open loop system as will be elaborated upon below. The hydraulic system 30 can generally be described as having a first circuit 31 for driving track 14, a second circuit 33 for driving track 114 and one or more further circuits for other hydraulic systems present on the vehicle 10. The tracks 14 and 114 are driven by independent but substantially similar circuits and only one will be explained in more detail on the understanding that the second circuit operates in a substantially similar fashion. Components involved in driving tracks 14 and 114 with like numerals have like functions. Although the circuits for driving the tracks are separate to a degree, they may share components where convenient such as the fluid reservoir 32 and the fluid supply 34.

The vehicle 10 has one or more reservoirs 32 that may be interconnected, for holding an actuating fluid such as hydraulic oil. A fluid supply such as pump 34 draws fluid from the reservoir 32. The fluid supply may be an engine driven single pump with either variable or fixed displacement, for supplying fluid to all systems on the vehicle 10, such as, for example, driveline, steering, work arms, and implements, or it may be a combination of pumps with more dedicated supply arrangements. For simplicity sake the fluid supply will be described as a fixed displacement pump 34 of which the fluid output depends on its rotational speed and associated losses. The pump 34 supplies fluid to a control valve 36 which may be of any suitable type. The control valve 36 shown is a valve which is normally in a position such that no fluid flows from pump 34 towards the motor 52, and such that no fluid flows from the motor 52 to the reservoir 32. The control valve 36 may be a proportional valve having an infinite number of positions to control the direction and volume of the fluid flowing through the control valve 36. The control valve 36 may be operated by an operator via a suitable input device 38. The input device 38 may be a mechanical arrangement such as a lever or an electrical/electronic arrangement such as a proportional roller switch. From control valve 36 the pressurized fluid can flow into either line 40 or 42, depending on the desired vehicle direction as selected by the operator. In this example the pressurized fluid from the pump 34 travels through line 40 towards the check valve 44. The check valve 44 may be a 2-way, 3-position over center valve being spring biased to a neutral position as shown and may be controlled by pilot lines 46 and 48. When the check valve 44 allows so, the pressurized fluid can travel via a line 50 towards a motor 52. The motor 52 is a variable displacement axial piston drive motor which may in principle have an infinite number of available swash angles. In one embodiment only a discrete number of those positions are selectable. For example, in one embodiment the motor may be classified as a two speed motor as only a first and second swash angle are selectable. From motor 52, the fluid returns via the line 56, the check valve 44, the line 40, the control valve 36, and the line 58 to the reservoir 32.

The swash angle position of the motor 52 is in this example controlled by an arrangement 54 which includes a hydraulic valve 60 and a shuttle valve 62. Another suitable arrangement may be selected, if preferred, or additional restrictors or orifices may be fitted to enhance flow characteristics, for example to soften the impact of the change while shifting the swash angle position of the motor 52. The valve 60 is of the electro-hydraulic solenoid operated type and is controlled by a logic element 65 such as an ECU. The logic element 65 receives inputs from an operator via several input devices located in the operator's environment. An input device 64, which may for example be a switch, controls both the valves 60 and 160 and requests the logic element 65 to trigger a similar effect in both the motors 52 and 152. Working on the theoretical principle that both systems are set up identically and no differences in set up and tolerances are present, the operation of the input device 64 will place both motors 52 and 152 in identical positions, i.e., either they are both in their first swash angle positions or they are both in their second swash angle positions. For motor 52 this is achieved by shifting the valve 60 in a position such that the line with the highest pressure, i.e., one of the lines 50 and 56, will provide pressurized oil via shuttle valve 62 to a swash angle controller 66 on the motor 52. The motor may also be spring biased such that the motor is in a default position unless it receives a signal from the logic element 65. The functions of input devices 68 and 168, which in this example may be switches, are very similar to that of the input device 64 except for that each of the input devices 68 and 168 do not control both the motors 52 and 152. The input device 64 controls both the motors 52 and 152, the input device 68 controls motor 52 but not the motor 152, and the input device 168 controls the motor 152 but not the motor 52. In one embodiment the input devices 68 and 168 are biased switches and return to their default position when the operator no longer engages them, while the input device 64 remains in the position as selected by the operator.

Figure 2:
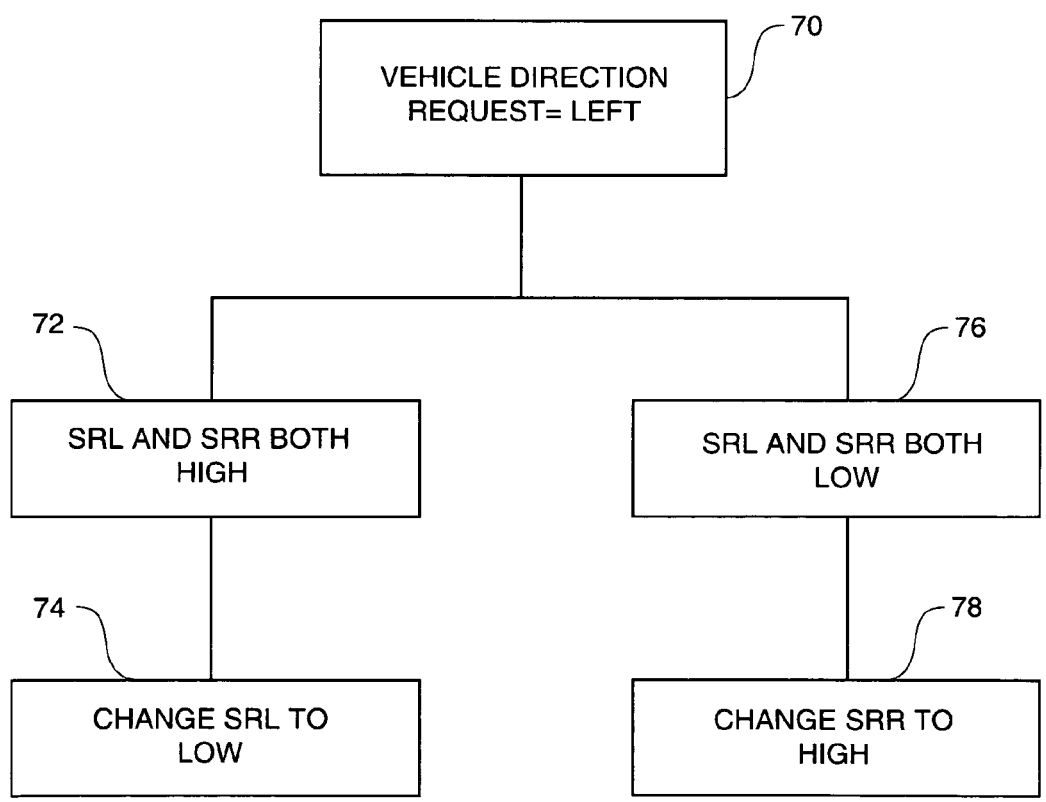
FIG. 2 is a flowchart of an exemplary method for controlling the vehicle of FIG. 1.

One embodiment of the method for steering the vehicle 10 is shown in FIG. 2. It is to be noted that the flowchart is not exhaustive and that more steps and routines may be added or that certain steps may be in a different order. The box 70 represents the process of receiving a vehicle direction change request as selected by the operator or another arrangement such as an at least partially automated management system. In this example the direction change request corresponds to a request for a turn towards the left. The change request may be received by the logic element 65 which determines the current speed ranges of both motors 52 and 152. In this embodiment the speed range of the left hand side motor 52 is abbreviated to SRL and the speed range of the motor of the right hand side motor is abbreviated to SRR. HIGH means the motor has a swash angle position corresponding to the high vehicle speed range, while LOW therefore corresponds to the low vehicle speed range. The logic element 65 may determine SRL and SRR in any suitable way such as, for example, measuring or sensing electrical or electronic signals, sensing the actual physical position of a component of the motors 52 and 152. To fulfill the left turn request, the left hand side track 14 must run slower than the right hand side track 114, hence the motor 52 must run slower than the motor 152. If both SRL and SRR are in the high speed position as shown in the box 72, the process moves on to the box 74 and SRL is changed to LOW. This results in the motor 52 and corresponding track 14 slowing down and the vehicle 10 turns to the left. If both SRL and SRR are in HIGH as shown in the box 76, the process of the box 78 is followed and SRR is changed to high. This results in the motor 152 and corresponding track 114 speeding up and the vehicle 10 turns to the left.

In one embodiment, SRL and SRR are not equal as long as one of the input devices 68 and 168 is activated. SRL and SRR can be equalized by either deactivating the one input device that is activated or by activating both the input devices 68 and 168. By equalizing SRL and SRR the vehicle will again commence traveling in a straight line as long as no other factors that may influence vehicle direction are present.

INDUSTRIAL APPLICABILITY

When the vehicle is not moving, any undesired movement of the vehicle 10 is prevented by check valves 44 and 144 blocking the return lines from the motors 52 and 152 to the tank, therefore holding the motors 52 and 152 and the associated track 14 and 114 in a fixed position as the motors cannot dispose of any fluid.

During operation the operator actuates both the control valves 36 and 136 to the same extent to start moving the vehicle 10 in a straight line. For the exemplary embodiment as shown in FIG. 1 the controls for the control valves 36 and 136 may be two manual and adjacently mounted levers that can be pulled or pushed. As again the function of both the circuits for the tracks 14 and 114 is similar only one will be explained in more detail.

To overcome the friction associated with moving the vehicle, the pressure in the motor 52 has to increase. The increase in pressure is sensed by the check valve 44 via the pilot line 46. Once the pressure has reached a certain level the valve 44 shifts to the right hence engaging the left portion of the valve 44 into the circuit. This opens the connection between the return lines 50 and 42 from the motor to the tank after which the vehicle will start to move.

The check valve 44 has the function of preventing an uncontrolled run-away condition of the vehicle 10 while traveling down a slope. While on the slope the vehicle 10 is inclined to travel at a higher speed than selected by the operator. The track 14 tries to increase the speed of the motor 52 which leads to a drop in pressure 56 and hence in pilot line 46. This allows the check valve 44 to shift back to its neutral position and therefore blocks the connection between the return lines 50 and 42. This in turn will prevent the motor 52 from rotating and therefore brakes the vehicle. Pressure will rise subsequently in the lines 40 and 56 thereby shifting the check valve 44 once again to the right resulting in the vehicle 10 commencing controlled straight line movement once more. Normally this cycle will be short such that the machine is likely not to come to a complete standstill, although the machine behavior may be jerky.

At any time during the operation of the vehicle 10 the operator may engage the input device 64. The input device 64 will place both the motors 52 and 152 simultaneously in similar swash angle positions as described above. When the minimum swash angle is selected the vehicle 10 will be in a high speed, low torque mode suitable for operations such as long distance travel. When the maximum swash angle is selected the machine is in the low speed, high torque mode which may be more suited to work operations or delicate maneuvering.

A combination of the controls mentioned above therefore enables the operator to select a speed range with input device 64 and a speed selection within the selected speed range by operating the control valves 36 and 136. This type of system is usually operated with a fixed engine speed, but if a variable engine speed regime is adopted this will of course influence the fluid output of the pump 34 and therefore the vehicle speed.

A change in direction of the vehicle 10 can be achieved by selecting a different position for the control valve 36 than for the control valve 136 and vice versa. By selecting different control valve positions each of the motors 52 and 152 is provided with a different flow rate and one of the tracks 14 and 114 will run faster than the other track hence inducing a turn of the vehicle 10. However, varying the flow rate through one of the control valves 36 and 136 to induce such a turn leads to downstream pressure fluctuations which may impact on the behavior of the check valves 44 and 144. The check valves 44 and 144 are sensitive to pressures in the lines to which they are connected as described above and may therefore open and close repeatedly making the turning movement jerky. Especially at high speeds this may lead to dangerous situations where the jerking movement may be exaggerated as a sudden jerk may lunge the operator forward or backward which in turn then may induce an uncontrolled movement by the operator of the control valves 36 and 136. An operator may therefore decide to significantly reduce the speed of the vehicle or to bring it to a standstill before instigating a turn with the valves 36 and 136.

Instead of controlling the control valves 36 and 136 the operator may decide to operate one of the input devices 68 and 168. In one embodiment the input devices may be mounted on the levers that control the control valves 36 and 136 so the operator does not have to move his hands from the levers. If for example the operator wants to make a left hand turn, the left hand track 14 must be running at a lower speed than the right hand track 114. If the motors 52 and 152 are both in the high speed mode, i.e., in the minimum swash angle position, engaging the input device 68 will trigger the logic element 65 to place the motor 52 in the maximum swash angle position thereby reducing the speed of the track 14. If the motors 52 and 152 are both in the low speed mode, i.e., in the maximum swash angle position, engaging the trigger 68 will trigger the logic element 65 to place the motor 152 in the minimum swash angle position thereby increasing the speed of the track 114. The logic element 65 may therefore be programmed such that attempts are made to have a consistent response of the vehicle 10 in response to activating one of the input devices 68 and 168. For example, activating the input device 68 may, where possible, always result in a left hand turn, while activating the input device 168 may, where possible, always result in a right turn. It will be clear from the above that this may require a different action by the logic element 65 in that it may need to operate the motor 52 in certain conditions and the motor 152 in other conditions. The conditions may have to take into account the state of the motors 52 and 152 at the moment of receiving the steering request, but it may also depend on the type of vehicle. For example, hydraulic excavators are commonly equipped with an operator platform which is rotatably mounted on a tracked undercarriage. The platform may therefore be rotated such that the operator faces either towards the front or the rear of the machine as defined by the undercarriage. This will of course have implications for what the operator perceives to be left and right. To make the controls more operator friendly the logic element 65 may be programmed and equipped such that it can determine the orientation of the operator or the cab and adapt the response to the steering request accordingly.

Steering the vehicle 10 by engaging either of input devices 68 and 168 results in minimal disturbance of the position of the check valves 44 and 144. Of course the check valves 44 and 144 may momentarily be influenced but to a lesser degree than occurs when steering by operating the control valves 36 and 136. Of course the check valves 44 and 144 may still influence the vehicle behavior if any of the maneuvers take place on a slope as described above.

Steering the vehicle 10 by changing the swash angle position of one of the motors 52 and 152 to a preset position will lead to a turning circle having a fixed radius as the turn is not proportionally controllable. This may be preferred by an unskilled operator to, for example, make minor corrections to straight line travel as the length of turn is dictated by the duration of actuation of one of the input devices 68 and 168 rather than the duration and degree of displacement of the control levers of the proportional valves 38 and 138.

It will be apparent to those skilled in the art that various modifications and variations can be made to the disclosed embodiments without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

The invention claimed is:

1. A vehicle having an open loop hydraulic drive system, the open loop hydraulic drive system comprising:
   a first variable displacement hydraulic motor for driving a ground engaging mechanism at a first side of the vehicle;
   a second variable displacement hydraulic motor for driving a ground engaging mechanism at a second side of the vehicle;
   a control mechanism configured for steering the vehicle by changing the displacement of one of the first and second motors, the control mechanism including a first input device for controlling only one of the first and second motors in response to at least one first operator input; and
   a speed range input device for controlling a speed range of the vehicle by substantially simultaneous selection of similar displacements of the first and second motors in response to an operator input indicating a desired speed range.

2. A vehicle according to claim 1, wherein each of the first and second motors has a discrete number of selectable displacement positions.

3. A vehicle according to claim 1, wherein the first input device is configured to control the first motor, the control mechanism further includes a second input device configured to control the second motor, and the vehicle further includes:
   a logic element for adapting a change of the first and second motors in response to the actuation of the first and second input devices in relation to the displacement of the motors as selected via the speed range input device.

4. A vehicle according to claim 1, wherein the first and second motors form part of a first and second drive circuit, respectively, the first and second drive circuits further including at least one variable fluid supply for supplying at least one of the first and second drive circuits with pressurized fluid.

5. A vehicle according to claim 4, wherein the first and second drive circuits include a first check valve disposed between the at least one fluid supply and the first motor and a second check valve disposed between the at least one fluid supply and the second motor, the first and second check valves being configured to prevent a run-away condition of the vehicle.

6. A vehicle according to claim 5, wherein the at least one fluid supply is a pumping arrangement shared by both the first and second drive circuits, and wherein the quantity of fluid to the first drive circuit is regulated by a first proportional control valve and the quantity of fluid to the second drive circuit is regulated by a second proportional control valve.

7. A vehicle according to claim 6, further comprising at least a third input device for actuating the first and second control valves separately.

8. The vehicle of claim 1, wherein the desired speed range is selectable from a plurality of speed ranges including a first speed range and a second speed range that is generally higher than the first speed range.

9. A method of turning a vehicle having an open loop hydraulic drive system, the open loop hydraulic drive system having a first variable displacement hydraulic motor for driving a ground engaging mechanism at a first side of the vehicle, and a second variable displacement hydraulic motor for driving a ground engaging mechanism at a second side of the vehicle, the method comprising:
   receiving a first requested change in vehicle direction to turn the vehicle;
   determining that both the first and second motors are in a similar speed range selectable from a plurality of speed ranges, the plurality of speed ranges including a first speed range and a second speed range; and
   shifting only one of the first and second motors from the first speed range to the second speed range in response to the first requested change in vehicle direction and the determination.

10. The method of claim 9, including opening a check valve in a return line from at least one of the first and second motors, the check valve being normally closed to prevent a run-away condition of the vehicle.

11. The method of claim 9, including selecting a desired vehicle speed range by substantially simultaneously placing both the first and second motors in similar displacements in response to the selection.

12. The method of claim 11, wherein shifting only one of the first and second motors overrides the selection of the desired vehicle speed range for placing both the first and second motors in similar displacements.

13. The method of claim 11, wherein:
   the first speed range is one of a low vehicle speed range or a high vehicle speed range;
   the second speed range is the other one of the low vehicle speed range or the high vehicle speed range; and
   the method further comprises:
   determining that a current position of the first motor in relation to the selected speed range is in a displacement position corresponding to the first vehicle speed range; and
   changing the current position of the first motor into a displacement position corresponding to the second vehicle speed range in response to the first requested change in vehicle direction.

14. The method of claim 11, wherein:
   the hydraulic motors are shifted separately using a first input device and a second input device, respectively; and
   the desired speed range associated with the substantially simultaneous similar displacements of both the first and second motors is selectable via a third input device.

15. The method of claim 9, wherein the vehicle includes a fluid supply arrangement for supplying a first variable fluid flow to the first motor and a second variable fluid flow to the second motor, the method further including controlling a desired vehicle speed and direction by manipulating at least one of the first and second fluid flows.

16. The method of claim 9, including supplying the first and second motors with different fluid flow rates and simultaneously placing the first and second motors in different displacements.

17. The method of claim 9, further including:
   receiving a second requested change in vehicle direction; and
   shifting the only one of the first and second hydraulic motors from the second speed range to the first speed range in response to the second requested change in vehicle direction.

18. The method of claim 9, further including:
   shifting only the first hydraulic motor from the first speed range to the second speed range in response to the first requested change in vehicle direction;
   receiving a second requested change in vehicle direction; and
   shifting only the second hydraulic motor from the first speed range to the second speed range in response to the second requested change in vehicle direction.

19. The method of claim 9, further including determining, using a control unit, a current speed range for both the first and second motors by measuring at least one electrical signal or sensing an actual physical position of a component of the first and second motors.

20. An open loop hydraulic drive system for a vehicle, the system comprising:
- a first variable displacement hydraulic motor configured for driving a ground engaging mechanism at a first side of the vehicle;
- a second variable displacement hydraulic motor configured for driving a ground engaging mechanism at a second side of the vehicle; and
- a control mechanism configured for steering the vehicle by changing the displacement of one of the first and second motors, the control mechanism including a first operator input device and a second operator input device for controlling the first and second motors, respectively, in response to respective first and second operator inputs;
- a third operator input device for controlling a speed range of the vehicle by substantially simultaneous selection of similar displacements of the first and second motors in response to a third operator input;
- at least one fluid supply configured to supply fluid to the first and second motors;
- a first proportional control valve configured to control a quantity of the fluid supplied to the first motor;
- a second proportional control valve configured to control a quantity of the fluid supplied to the second motor; and
- fourth and fifth operator input devices for actuating the first and second control valves, respectively, in response to respective fourth and fifth operator inputs.

* * * * *